United States Patent [19]

Okino et al.

[11] Patent Number: 5,019,911
[45] Date of Patent: May 28, 1991

[54] IMAGE PICKUP APPARATUS WITH MODE DEPENDENT LIGHT MEASUREMENT

[75] Inventors: Tadashi Okino, Kanagawa; Makoto Ise, Tokyo, both of Japan

[73] Assignee: Canon Kabushiki Kaisha, Tokyo, Japan

[21] Appl. No.: 526,765

[22] Filed: May 18, 1990

Related U.S. Application Data

[63] Continuation of Ser. No. 240,954, Sep. 6, 1988.

[30] Foreign Application Priority Data

Sep. 10, 1987 [JP] Japan .............................. 62-225375
Sep. 10, 1987 [JP] Japan .............................. 62-225376

[51] Int. Cl.$^5$ ............................................. H04N 3/14
[52] U.S. Cl. ........................... 358/213.19; 358/213.22
[58] Field of Search ..................... 358/213.19, 213.22, 358/213.13, 228, 209, 909

[56] References Cited

U.S. PATENT DOCUMENTS 4,603,354  7/1986  Hashimoto et al. ................. 358/909
4,663,669  3/1987  Kinoshita et al. .............. 358/213.19
4,750,041  7/1988  Vogel et al. ..................... 358/213.22
4,780,764  10/1988 Kinoshita et al. .............. 358/213.19

Primary Examiner—Stephen Brinich
Attorney, Agent, or Firm—Robin, Blecker, Daley & Driscoll

[57] ABSTRACT

An image pickup apparatus comprising an image pickup element capable of selectively reading an object image in either one of a field image pickup mode and a frame image pickup mode, a light measuring circuit for measuring the object brightness, and a light emitting device, wherein there is provided a control circuit for controlling the exposure amount to a correct value by changing the light measuring characteristic of the light measuring circuit on the basis of the selected one of the field and frame image pickup modes.

32 Claims, 11 Drawing Sheets

IMAGE PICKUP APPARATUS WITH MODE DEPENDENT LIGHT MEASUREMENT

This application is a continuation of application Ser. No. 240,954, filed Sept. 6, 1988.

BACKGROUND OF THE INVENTION

1. Field of the Invention

This invention relates to image pickup apparatus and, more particularly, to image pickup apparatus capable of selectively changing over between a field image pickup mode and a frame image pickup mode.

2. Description of the Related Art

In the image pickup apparatus capable of telephoto photography using the zoom lens or interchangeable lens, in the case when the focal length of the lens is made long, camera-shake is apt to occur. Particularly when the image pickup time is not short, this camera-shake becomes more apt to occur.

To prevent such a camera-shake, in the conventional film camera, the shutter was run at a high speed so that the exposure time was shortened, thus solving the problem.

However, in the solid state image sensor using CCD, MOS, etc. and the image pickup tube, because its sensitivity is not so high as to run the shutter at the high speed, prevention of camera-shake becomes more difficult than for the film camera.

Also, in indoor photography, etc., when photographing an object of low brightness, because of the low sensitivity, under-exposure is apt to occur.

Thus, in the case of under-exposure, there was need to compensate for the insufficiency of the exposure by changing over to flash photography, etc.

However, in the conventional image pickup apparatus, there was a problem that in the case of shooting by using light emitting means such as a flash device, in that changing over of field/frame image pickup mode in the image pickup means accompanies erring of the exposure.

SUMMARY OF THE INVENTION

With such a problem in mind, an object of this invention is to provide an image pickup apparatus capable of picking up an image, while suppressing an error of exposure as far as possible even when shooting an object of low brightness.

To achieve this, in an embodiment of this invention, an image pickup apparatus includes image pickup means capable of selectively reading an object image in one of a field image pickup mode and a frame image pickup mode, light measuring means for measuring an object brightness, and light emitting means, and control means for controlling an exposure amount to a correct value by changing a light measuring characteristic of the light measuring means on the basis of the selected field image pickup mode or frame image pickup mode.

According to such an embodiment, since the light measuring characteristic for the object brightness is changed over between the field image pickup mode and the frame image pickup mode, when in electronic type flash photography, error of the exposure does not take place.

Also, to achieve the above-described object, in another embodiment of this invention, an image pickup apparatus is provided with means for controlling an exposure amount or an amount of emitted light to a correct value, when selecting either of the field image pickup mode and the frame image pickup mode, on the basis of the selected image pickup mode.

Thereby, in the case of using the light emitting means, by selecting one of the field image pickup mode and the frame image pickup mode, because the sensitivity of the image pickup means differs, by shifting one step the program of the object distance and aperture value, or shifting the amount of light emitted, a correct exposure is made in either of the image pickup modes. Thus, even when the measured light value of the object brightness is low, it becomes possible to compensate for the insufficiency of the exposure. Moreover, the exposure also can be optimized.

Other objects and features of the invention will become apparent on the basis of the following written specification and drawings.

DETAILED DESCRIPTION OF THE PREFERRED EMBODIMENTS

Figure 1:
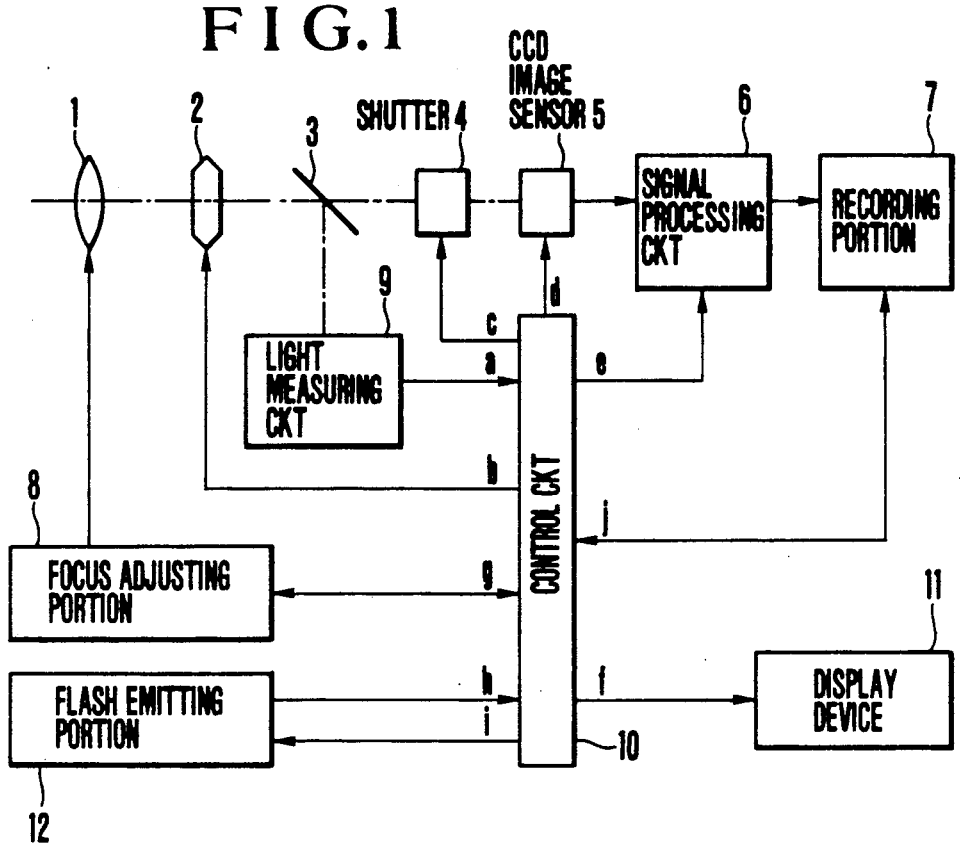
FIG. 1 is a diagram roughly illustrating a first embodiment of an image pickup apparatus according to the present invention.
Figure 2:
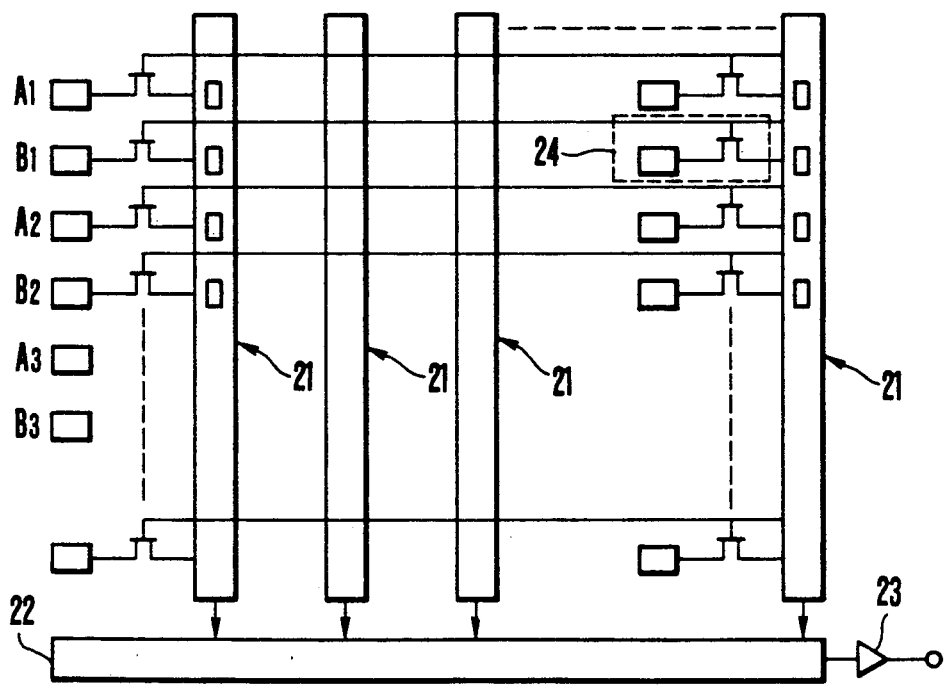
FIG. 2 is a view illustrating an example of the basic structure of an CCD image sensor used in the same embodiment.

In the following, on the basis of the drawings, the embodiments of this invention are described. FIG. 1 is the diagram roughly illustrating the first embodiment of the image pickup apparatus according to this invention. FIG. 2 is the view illustrating an example of the basic structure of the CCD image sensor used in the same embodiment. 1 is an optical system for forming an image of an object to be photographed; 2 is a diaphragm; 3 is a beam splitter; 4 is a shutter; 5 is a CCD image sensor; 6 is a signal processing circuit; 7 is a recording portion for recording the signal process result on a magnetic recording medium, etc.; 8 is a focus adjusting portion; 9 is a light measuring circuit; 10 is a control circuit; 11 is a display device for displaying the control result, etc.; 12 is a flash emitting portion (for example, strobe (trademark)); 21 is a vertical CCD shift register group of the CCD image sensor 5; 22 is a horizontal CCD shift register; 23 is a buffer amplifier; 24 is a sensor portion comprising a photoelectric converting portion of photodiodes, etc. and transfer gates, illustrating the basic structure of the sensor.

The beam splitter 3 is to divide the incident light from the object to an image pickup system comprising the CCD image sensor 5 and a light measuring system comprising the light measuring circuit 9.

The control circuit 10 has a function of computing a shutter speed or an aperture value by detecting the object brightness through a line "a" from the light measuring circuit 9, and other functions. In accordance with this computation result, the control circuit 10 controls the diaphragm 2 and the shutter 4 through lines "b" and "c", and the CCD image sensor 5 through a line "d", thus changing over between the field image pickup mode and the frame image pickup mode. Also, through a line "e", the control circuit 10 performs changing of the sensitivity by adjusting the gain for the signal in the signal processing circuit 6. Also, the control circuit 10 displays the control results, etc. on the display device 11 through a line "f" and controls the focus adjusting portion 8 and the flash emitting portion 12 through a line "g" and lines "h" and "i". As to the control over the flash emitting portion 12, it is through the line "h" that the attachment or detachment of the flash emitting portion 12 and the possible-impossible state of using the flash emitting portion 12 due to the completion or incompletion of full charging at the time of attachment are output, and through the line "i" that controlling of the flash emission time is performed. Further, the control circuit 10 also performs controlling of various kinds of timings of the recording portion 7 through a line "j", and, besides this, has even functions of releasing, detecting the changed states of other switches, etc.

The CCD image sensor 5 of FIG. 2 operates as follows: Signal charge accumulated in each sensor portion 24 is selectively taken in each vertical CCD shift register 21 depending on the presence or absence of a pulse given to the transfer gates from the outside within a vertical blanking period, and, after that, taken in the horizontal CCD shift register 22 by one row for each horizontal blanking period.

And, during the horizontal video period, signals pass through the horizontal CCD shift register 22 and are output from the buffer amplifier 23 sequentially.

Here, in the frame image pickup mode, after the exposure over the entire frame, the light is shielded. During the subsequent vertical blanking period, signal charges in the odd number rows $A_1, A_2, A_3, \ldots$ are transferred to each vertical CCD shift register 21. Then, during each horizontal blanking period, they are transferred by one row to the horizontal CCD shift register 22 sequentially, and, during each horizontal scanning period, the signals of the alternate rows $\ldots A_3, A_2, A_1$ are read out sequentially as a first field signal. After signal charges in the even number rows $B_1, B_2, B_3, \ldots$ have been taken in the vertical shift register group 21 during vertical blanking period after this reading, the signals of the vertical shift register group 21 are taken in the horizontal shift register 22 by one row for each horizontal blanking period, and read out during each horizontal scanning period, so that the rows are read out in the order of $\ldots B_3, B_2, B_1$ as a second field signal.

In the field image pickup mode, on the other hand, after accumulation has been made by exposure for a predetermined period, signal charges of both of the odd number rows $A_1, A_2, A_3, \ldots$ and the even number rows $B_1, B_2, B_3, \ldots$ are first taken in each stage of each vertical CCD shift register 21 at the same time through the transfer gates, and then, when being transferred, are added in each pair of rows. After that, they are transferred to the horizontal CCD shift register 22 by one row after the addition for each horizontal blanking period, and, after this, read out from the horizontal CCD shift register 22 for the horizontal scanning period. Subsequently, in a similar manner, added signals such as $\ldots$ rows $A_3+B_3, A_2+B_2, A_1+B_1$, are sequentially read out in each horizontal scanning period. Also, the signal accumulated on each sensor portion during the reading of this first field period is read out for the second field period. But, at this time, the combination of two rows to be added is changed to $B_1+A_2, B_2+A_3, \ldots$ In such a manner, in the field image pickup mode, the amount of charge transferred in each signal bit to be read becomes 2 times as high as in the frame image pickup mode. Therefore, when in the field image pickup mode, as compared with when in the frame image pickup mode, the vertical resolving power is halved, but the sensitivity is increased twice.

Figure 3:
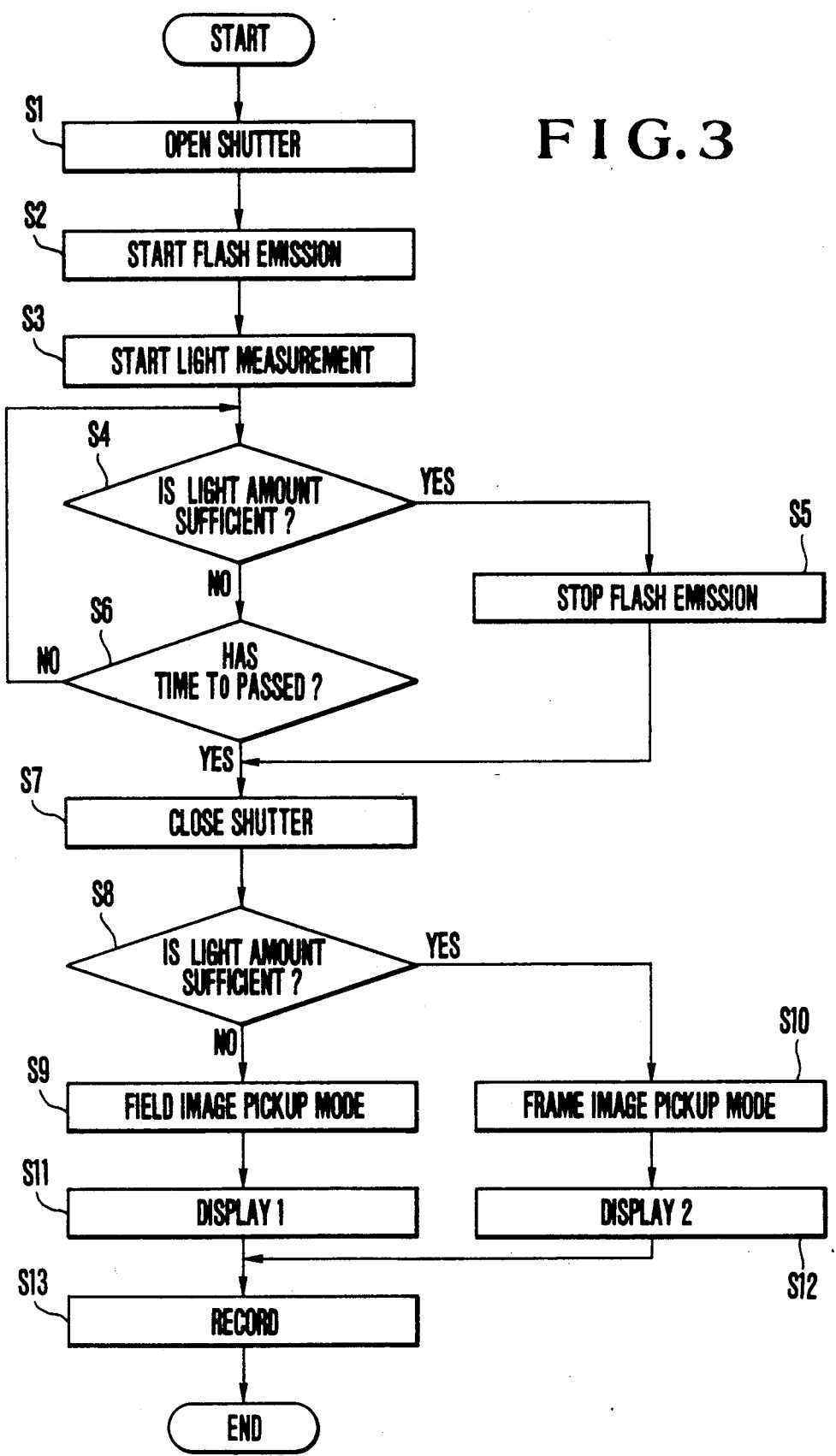
FIG. 3, FIG. 4 and FIG. 5 are flowcharts to explain the operation of a control circuit in the first, second and third embodiments respectively.

Next, referring to the flowchart of FIG. 3, the operation of the control circuit 10 is described.

After an electric power source is thrown, by turning on a release button (not shown), the program starts. At first, the control circuit 10 opens the shutter 4 through the line "c" in a step S1. In a step S2, the control circuit 10 turns on the flash emitting portion 12 through the line "i", initiating emission of flash. At the same time when the flash emits, a light measurement of the object brightness is started by the light measuring circuit 9 in a step S3. The measured light value (the integrated value of the amount of light received) from the light measuring circuit 9 is output through the line "a" to the control circuit 10. In a step S4, the measured light value $L_1$ input to the control circuit 10 is compared with a previously set correct light amount value $L_0$, so that judgment of whether or not the light amount is sufficient is carried out by the control circuit 10.

If the light amount is already sufficient ($L_1 \geq L_0$), the measured light value $L_1$ at that time point is held. In a step S5, the control circuit 10 turns off the flash emitting portion 12 through the line "i", stopping the emission of flash. Again, in the step S4, if the light amount is insufficient ($L_1 < L_0$), the step S4 and a step S6 are carried out repeatedly within a range of constant time $T_0$. Either at a time when the light amount becomes sufficient, the emission of flash is then stopped, or at the expiration of a time $T_0$, the measured light value $L_1$ up to that time point is then held. Incidentally, the constant time $T_0$ is the usual exposure time in flash synchronization (for example, about 1/60 sec.).

Next, in a step S7, the shutter 4 is closed by the control circuit 10 through the line "c".

In a step S8, from the measured light value $L_1$ held up on the preceding stage, the control circuit 10 judges again whether or not the light amount is sufficient on the basis of a reference value $L_0'$. The reference value $L_0'$ in here is set to about 70% of the correct light amount value $L_0$. For reading the CCD image sensor 5, in the case when the light amount is almost sufficient ($L_1 \geq L_0'$), the frame image pickup mode is automatically selected by the control circuit 10 through the line "d" (step S10), or in the case when insufficient ($L_1 < L_0 40$ ), the field image pickup mode in which the sensitivity becomes 2 times as high as in the frame image pickup mode is selected (step S9). In response to each mode, the fact that each mode of the frame image pickup and field image pickup has been selected is externally indicated by the display device 11 in a step S11 or S12.

The video signal read out from the CCD image sensor 5 passes through the signal processing circuit 6 and, in a step S 13, is recorded in proper timing on a recording medium of the recording portion 7.

Figure 4:
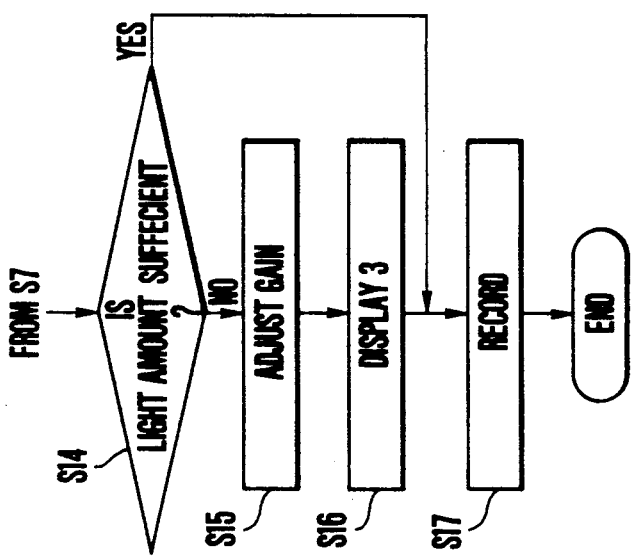

FIG. 4 is a flowchart to explain the second embodiment. Since the first half portion is similar to that of FIG. 3, the step S7 and those that precede are omitted.

In a step S14 exactly similar to the step S8 in the first embodiment, whether or not the light amount is sufficient is judged. In the sufficient case, the video signal to pass through the signal processing circuit 6 is treated with a previously initial set gain, and recorded on the recording medium of the recording portion 7 in a step S17. In the insufficient case, the gain for the video signal to pass through the signal processing circuit 6 is adjusted to a correct level by the control circuit 10 through the line "e". This is externally indicated on the display device 11 in a step S16. and recorded on the recording medium of the recording portion 7 in the step S17.

Figure 5:
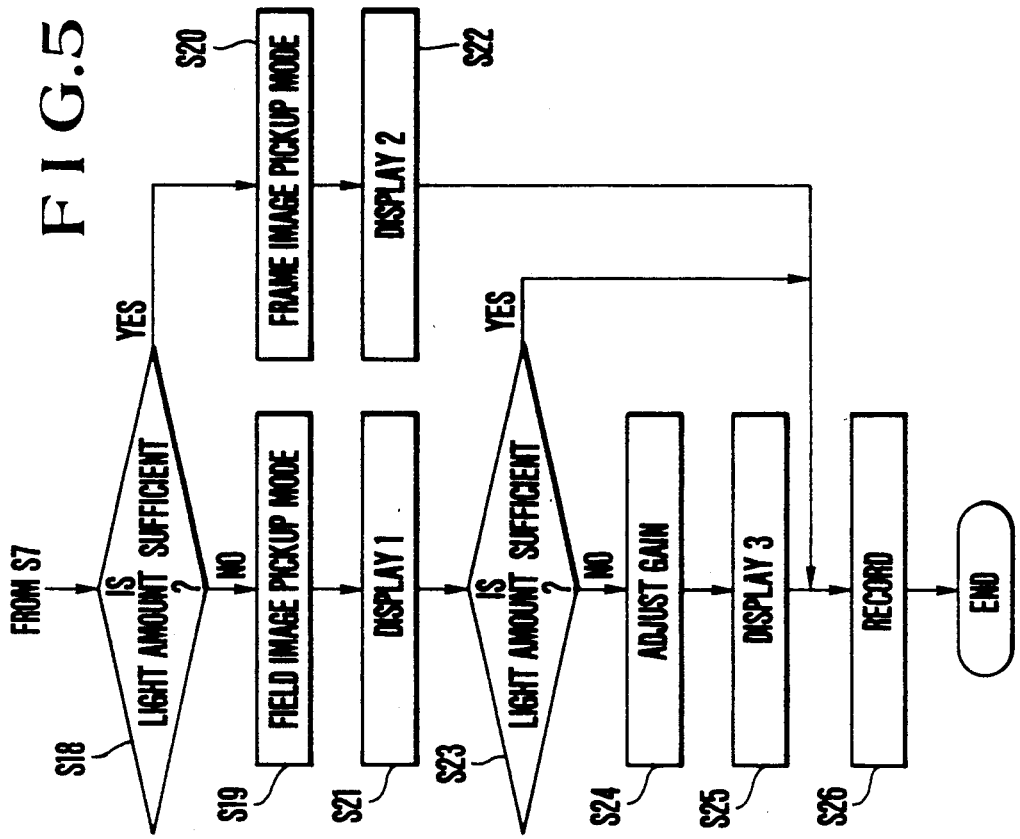

FIG. 5 is a flowchart to explain a third embodiment. Since the first half portion is similar to FIG. 3, the step S7 and those that precede are omitted.

Other operations than steps S23, S24 and S25 are exactly the same as the step S8 and those that follow in FIG. 3. That is, in the case when the light amount is sufficient in a step S18, the frame image pickup mode is selected in a step S20. After the fact that the frame image pickup mode has been selected is displayed in the display device 11 in a step S22, the video signal is recorded through the signal processing circuit 6 to the recording medium of the recording portion 7 in a step S26 while holding the gain of the signal processing circuit 6 fixed to the initially set value.

In the case that the light amount is insufficient in the step S18, the field image pickup mode is selected in a step S19. After this has been displayed on the display device 11 in a step S21, judgment of whether or not the light amount is sufficient is performed again by the control circuit 10 in a step S23. The judgment of the light amount in this step is made by taking into account the increased sensitivity due to the changing over to the field image pickup mode and by comparing a twice value $2L_1$ as much as the measured light value $L_1$ held in the step S7 and those that precede with the correct light amount value $L_0$.

In the case that the light amount is sufficient ($2L_1 \geq L_0$) in a step S23, the video signal is recorded through the signal processing circuit 6 on the recording medium of the recording portion 7 in a step S26, while leaving the gain of the signal processing circuit 6 fixed to the initial set value.

In the case that the light amount is insufficient ($2L_1 < L_0$) in the step S23, the gain for the video signal to pass through the signal processing circuit 6 is adjusted to a correct level by the control circuit 10 through the line "e". This is externally indicated in the display device in a step S25, and recorded on the recording medium of the recording portion 7 in a step S26.

In the foregoing embodiment, as the means for detecting the object brightness, the light measuring circuit 9 which derives input from the beam splitter is provided in separation from the video signal processing system.

But, of the output of the CCD image sensor 5, particularly the brightness component may be smoothed, thereby detecting the object brightness.

Again, in the foregoing embodiment, only the case of flash light amount adjustment has been described. But, it will be apparent that even on the operation of the case of performing no flash light amount adjustment, it is carried out in a similar manner.

Figure 6:
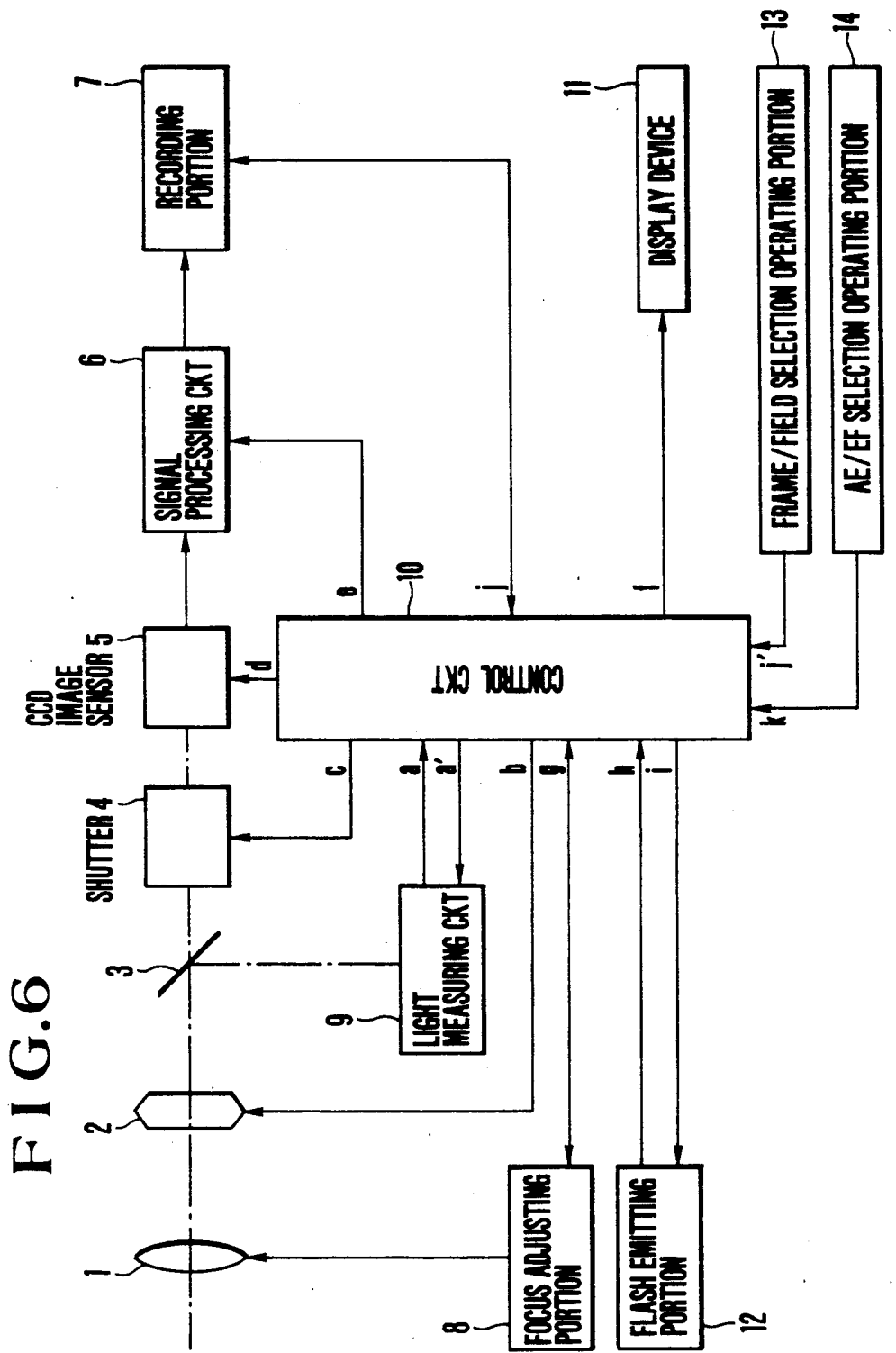
FIG. 6 is a diagram roughly illustrating a fourth embodiment of the image pickup apparatus according to the invention.

FIG. 6 is a diagram roughly illustrating the fourth embodiment of the image pickup apparatus according to this invention. Since the apparatus of FIG. 6 is almost similar in construction to the apparatus of FIG. 1, only the different point from FIG. 1 is described below. In the figure, a frame/field selection operating portion 13 is input to a terminal "j'" of the control circuit 10. Another selection operating portion 14 for changing over between daylight (hereinafter called "AE") photography and flash (hereinafter called EF) photography is input to a terminal "k" of the control circuit. Again, the control circuit 10 can control also the state of the light measuring circuit 9 through a terminal "a'".

The foregoing is the feature of the arrangement in this embodiment. In the following, particularly the function of the time of EF photography is described on the case of always fully firing the flash emitting portion 12 by reference to FIG. 7 and FIG. 8. It should be noted that the light amount of the flash emitting portion 12 in guide number terms is assumed to be $16m$ for the field image pickup mode, or $11m$ for the frame image pickup mode. (Because the field image pickup mode and the frame image pickup mode differ twice in sensitivity, this becomes the difference of the guide number.)

Figure 7:
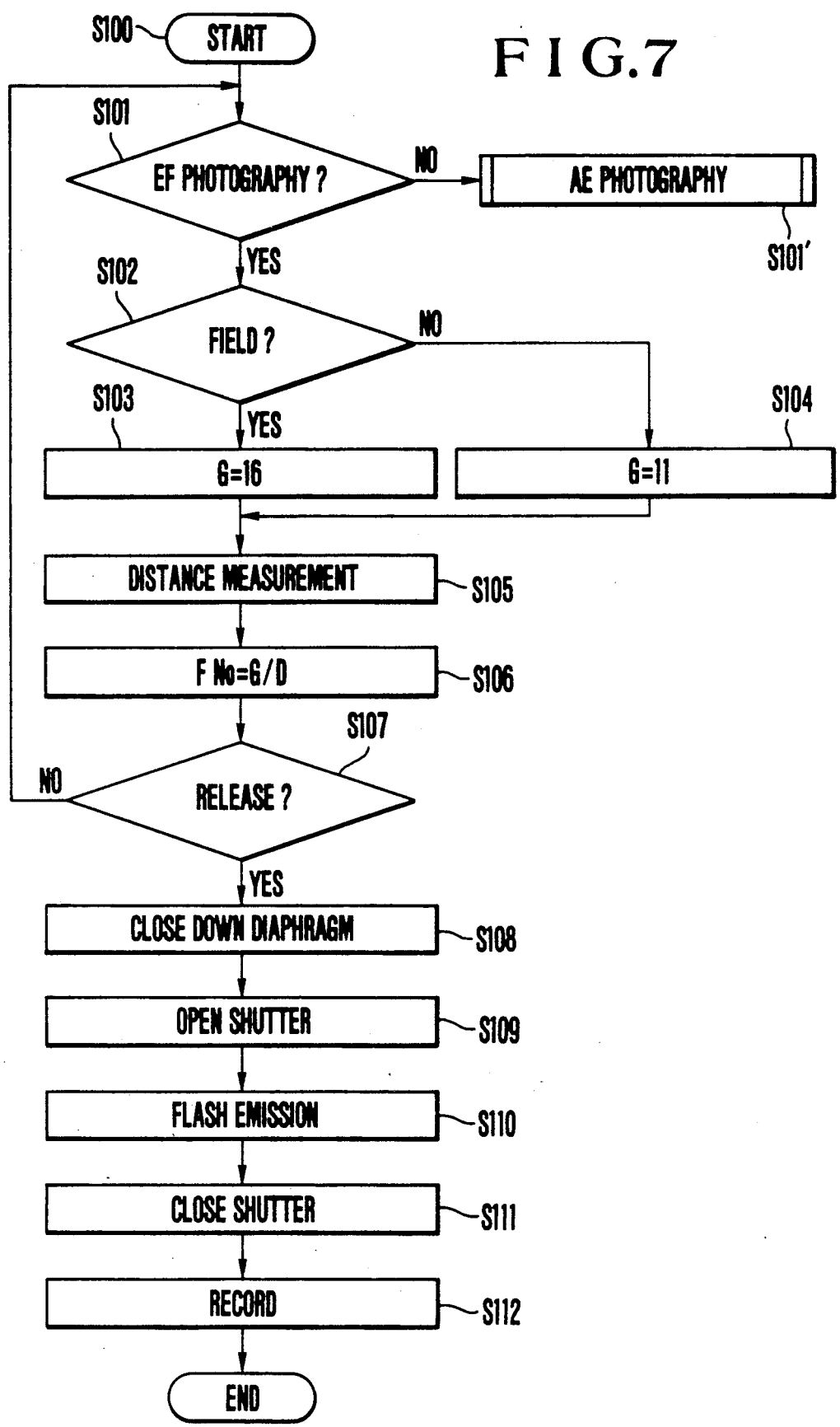
FIG. 7 is a flowchart illustrating an example of the operation of this embodiment.
Figure 8:
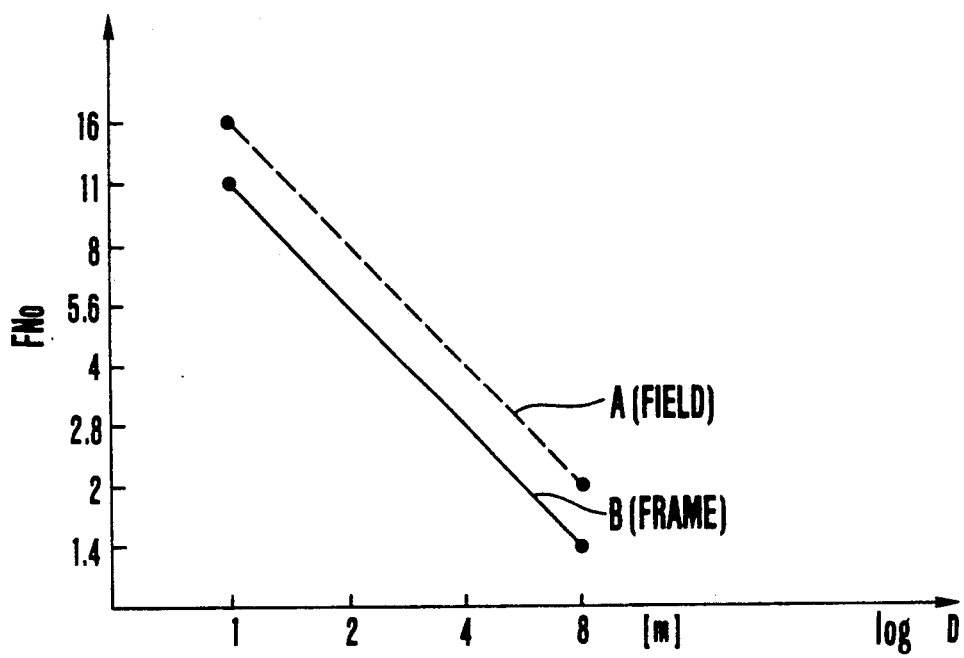
FIG. 8 is a graph illustrating the relationship of the distance with the aperture size.

FIG. 7 is a flowchart illustrating an example of the operation of the fourth embodiment of the invention. FIG. 8 is a graph illustrating the relationship between FNo and distance D. When an electric power source (switch) (not shown) is thrown in a step S101 of FIG. 7, the control circuit 10 discriminates the state of the AE/EF selection operating portion 14 from the terminal "k". In the step S101, when the EF photography is not selected, advance to an AE photography routine S101' occurs and the diaphragm 2 is controlled in accordance with the output of the light measuring circuit 9. In the case of EF photography in the step S101, then advance to the next step S102 wherein the control circuit 10 discriminates the state of a terminal "j'", that is, the state of the frame/field selection operating portion 13. In the case of the field image pickup mode in the step S102, since, in the field image pickup mode, the guide member takes $16m$ as has already been mentioned, the guide number variable G is set to 16 in a step S103. In the case that the result of the step S102 is the frame image pickup mode, since the guide number takes $11m$ as has already been mentioned, the guide number variable G is set to 11 in a step S104. Then advance to a step S105 wherein focusing is carried out through the focus adjusting portion 8, and the distance D to the object to be photographed is determined. And, an aperture value with which a correct light amount is obtained at that distance D:

$$FNo = G/D \quad (1)$$

is computed (step S106).

In this equation (1), if the frame image pickup mode is in use, $G = 11$, or if the field image pickup mode, $G = 16$. Therefore, the relationship between FNo and distance D becomes like lines A (in the case of the field image pickup mode) and B (in the case of the frame image pickup mode) of FIG. 8.

Next, in a step S107, whether or not a release member (not shown) has been operated is judged. If the release member has not been operated, then return is to the initial step S101.

If the release member is operated in the step S107, then the control circuit 10 closes the diaphragm 2 down to the value of equation (1) through the terminal "b" in a step S108. Then in a step S109, the control circuit 10 opens the shutter 4 through the terminal "c". Then in a step S110, the flash emitting portion 12 is caused to fully fire through the terminal "i". After that, the shutter 4 is closed in a step S111, and recording is carried out in a similar way to that described in connection with the other embodiments.

As is apparent from the foregoing description, in this embodiment on account of the twice difference in sensitivity between the field image pickup mode and the frame image pickup mode, because it appears as the difference of the guide number, the program of the distance and aperture is shifted one step as shown by the lines A and B of FIG. 8 so that a correct exposure is made in either of the modes.

An example of modification of the embodiment described in FIG. 6 through FIG. 8, or a fifth embodiment is described by reference to FIG. 9 and FIG. 10.

Figure 9:
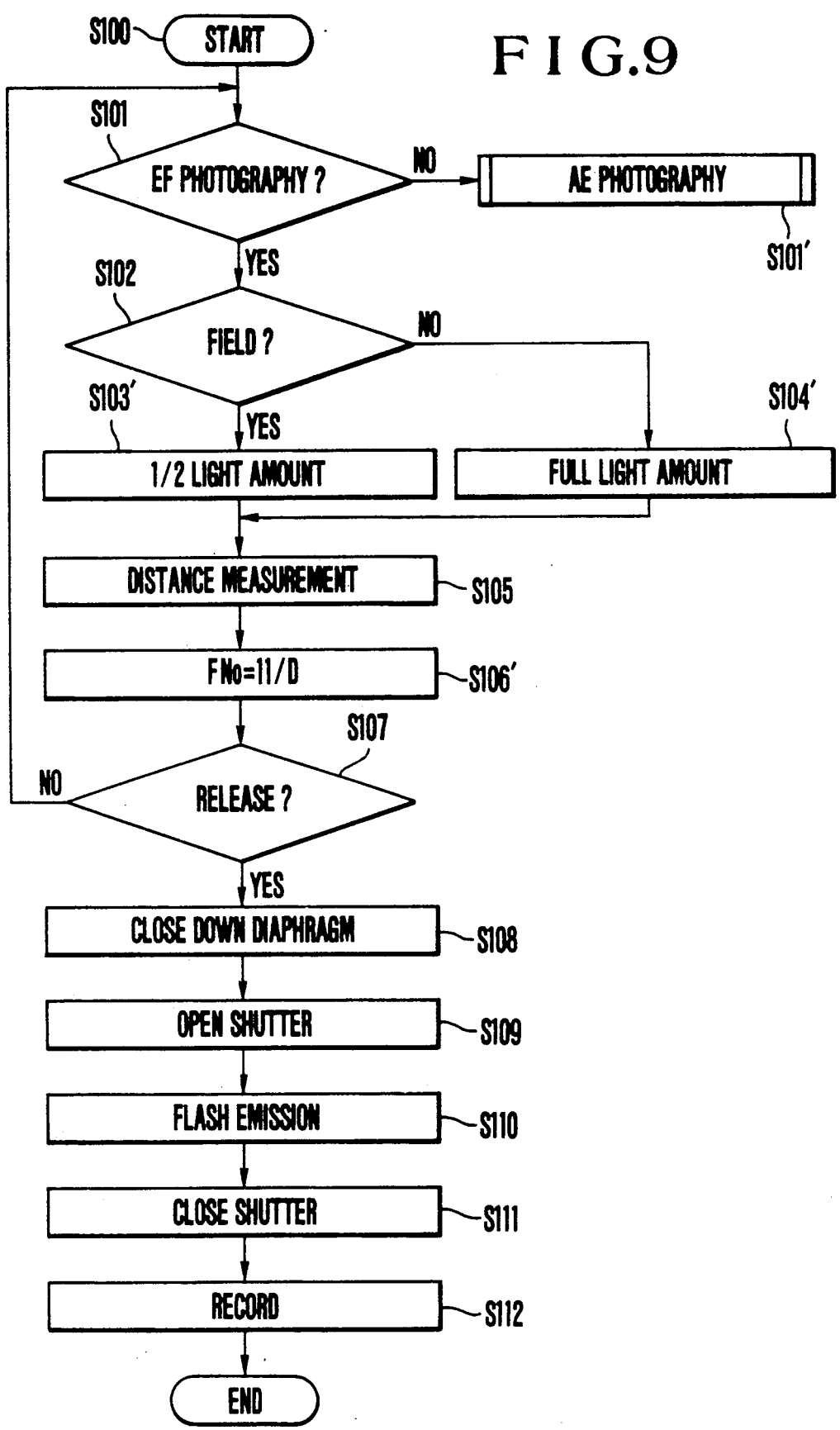
FIGS. 9 is a flowchart illustrating the operation of a fifth embodiment.

FIG. 9 is a flowchart illustrating the operation of the fifth embodiment. Since it is almost the same as FIG. 7, only the different point is described below. That is, the different lies in the point that after the judgment of the field/frame image pickup mode of the step S102, in the case of the field image pickup mode, the flash emitting portion 12 is fired with a light amount of ½ of the entire light emission. This is because, in the case of the field image pickup mode, of the higher sensitivity reflected to the larger guide number of 16m. For the case of firing with a half of this light amount, the guide number becomes, $$16/\sqrt{2} = 11m \quad (2)$$

This is equal to the guide number of the frame image pickup mode in the case where the flash emitting portion 12 fully fires. A step S106' for both of the frame image pickup mode and the field image pickup mode becomes:

$$FNo = 11/D \ (m) \quad (3)$$

Thus, the control is made according to the line B of FIG. 8.

Figure 10A:
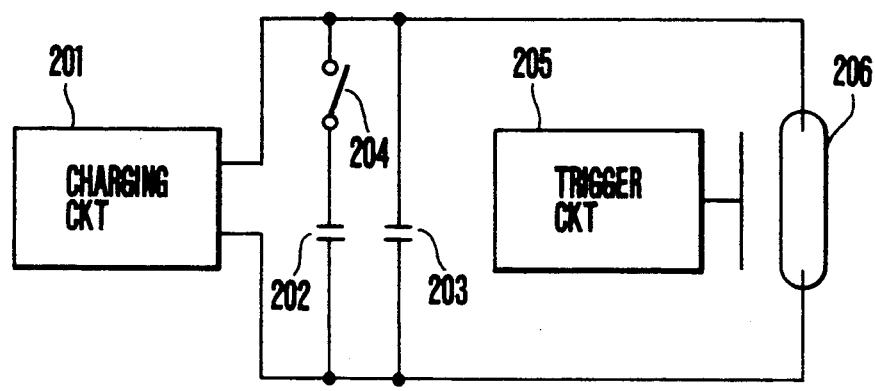
FIGS. 10(a) and 10(b) are diagrams of charging circuits of the flash emitting portion in the fifth embodiment.
Figure 10B:
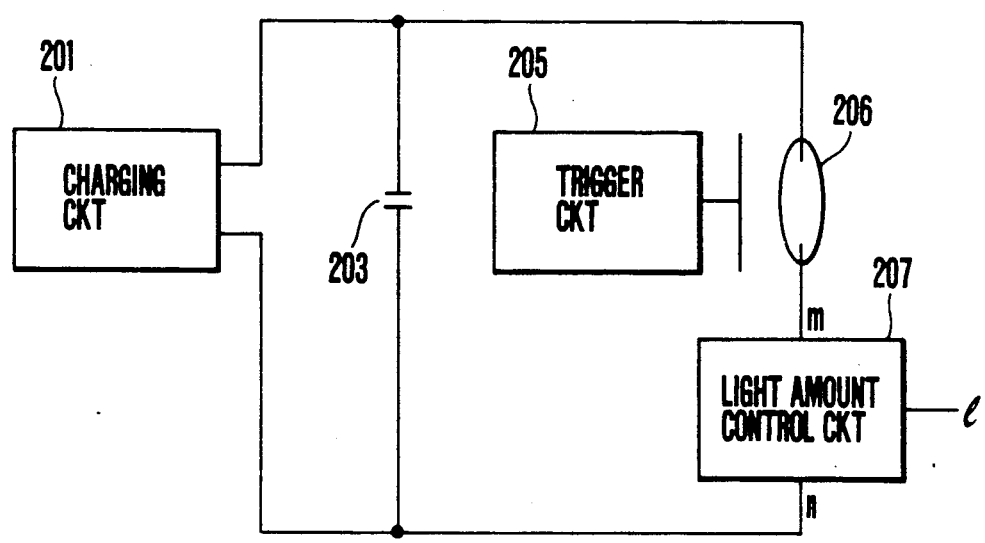

Here, means for causing the flash emitting portion 12 to fire to ½ of the entire light amount is shown in FIGS. 10(a) and 10(b).

A flash emitting portion shown in FIG. 10(a) comprises a charging circuit 201, main capacitors 202 and 203 divided to equal electrostatic capacities, a switch 204 connected in series to the main capacitor 202, a trigger circuit 205 and a flash discharge tube 206.

In FIG. 10(a), at a time point when the frame image pickup mode and the field image pickup mode have been discriminated, the switch 204, in the frame image pickup mode, is turned on or, in the field image pickup mode, is turned off by the control circuit 10. (This practical arrangement can be easily realized by constructing the switch 204 in the form of a relay or the like.) Therefore, charging and firing are carried out by using only the main capacitor 203 in the field image pickup mode, or by using both of the main capacitors 202 and 203 in the frame image pickup mode. In the case of the field image pickup mode, because of using only the main capacitor 203 as compared with the frame image pickup mode, the capacity is halved. Hence the light amount is also halved. Thus, the function of the step S103' of FIG. 9 is realized.

Next, since in the case of FIG. 10(b), its arrangement resembles FIG. 10(a), only the different point is described. In FIG. 10(b), the main capacitor 203 is one in number, being assumed to have the composite capacity of the capacitors 202 and 203 of FIG. 10(a). Also, a light amount control circuit 207 is connected in series with the flash discharge tube 206. This light amount control circuit 207 is so arranged assumed that when a control terminal l is high level, a terminal m-n path is conducting, or when the control terminal l is low level, the terminal m-n path becomes non-conducting. In FIG. 10(b), in the case of firing to the entire light amount, the terminal ( of the light amount control circuit 207 is maintained at the high level for a sufficiently long time to make the terminal m-n path conducting. In the case of firing to ½ light amount, the terminal l of the light amount control circuit 207 once made high level is changed again to the low level in a timing corresponding to the light amount of ½ of the entire amount of emitted light to make the terminal m-n path non-conducting.

Also, further as a sixth embodiment, an example of application of the invention to an apparatus in which the aperture is determined depending on the object distance, and at a time point when a corresponding reflected light from the object to that aperture has been obtained, the firing of the flash emitting portion is stopped. The arrangement of this embodiment may be the same as that shown in FIG. 6.

Figure 11:
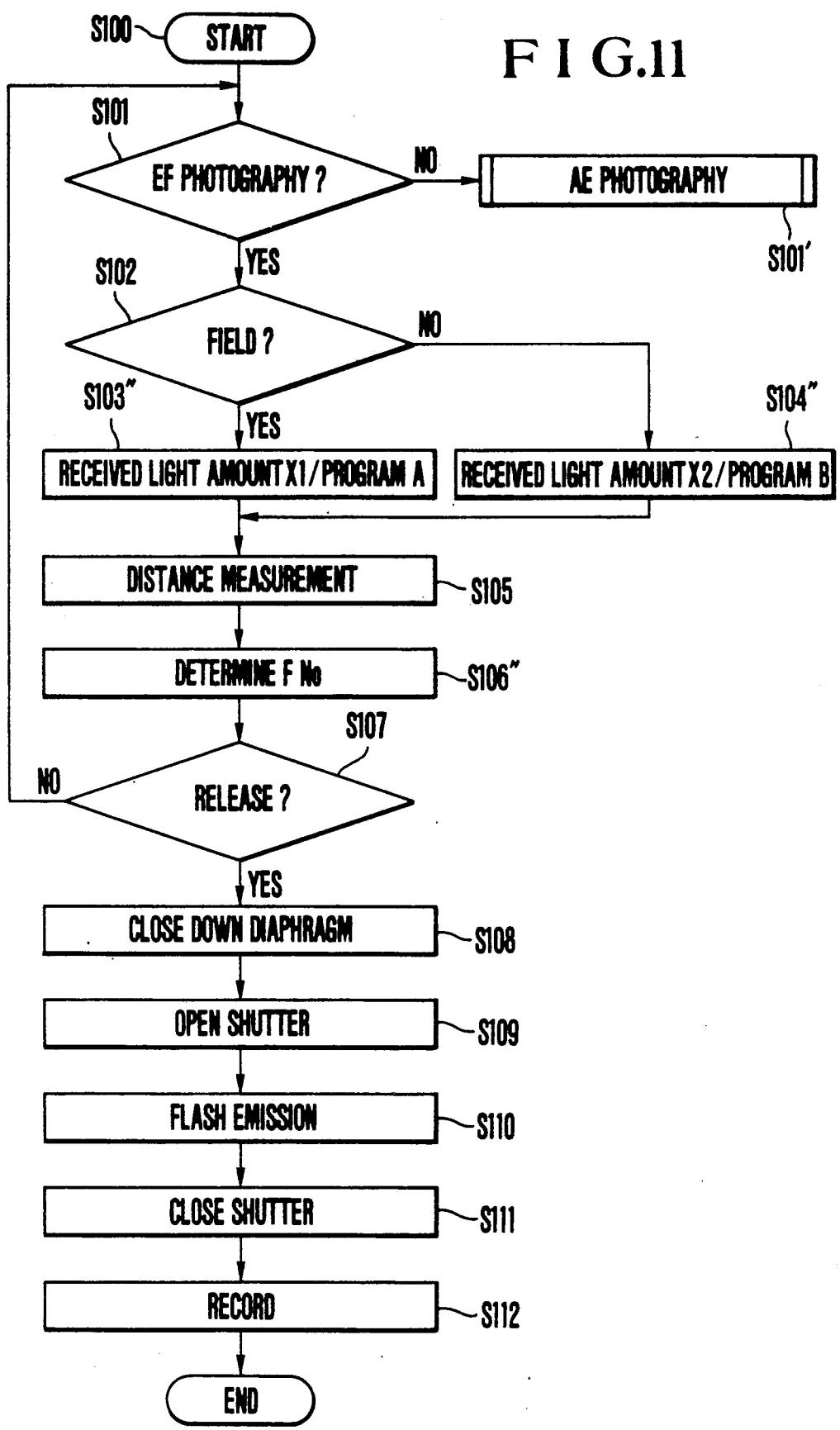
FIG. 11 is a flowchart illustrating an example of the embodiment of this fifth embodiment.

FIG. 11 is a flowchart illustrating an example of the operation of this embodiment. Since FIG. 11 is almost the same as FIG. 7, only the different point is described. In FIG. 11, after the judgment of the frame/field image pickup mode of the step S102, if the field image pickup mode is selected, the capacity of the integration capacitor of the flash light measuring circuit is set to a prescribed value in a step S103". In a later step S106", the aperture is determined according to a program line A in the graph of FIG. 13. Again, if the frame image pickup mode is selected, the capacity of the integration capacitor of the flash light measuring circuit is set to 2 times the prescribed value in a step S104". In a later step S106", the aperture is determined according to a program line B in the graph of FIG. 14. The change of the capacity of the integration capacitor herein mentioned is explained by using the circuit of FIG. 12.

Figure 12:
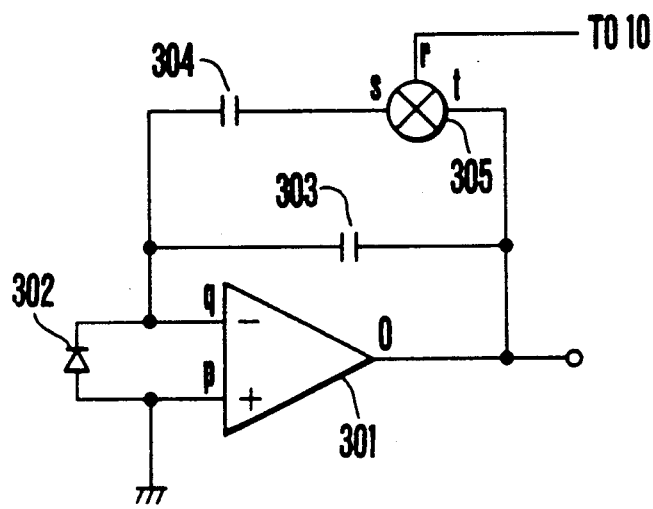
FIG. 12 is a diagram of a changeover circuit for the capacity of an integration capacity.

FIG. 12 is a diagram illustrating an example of the structure of the light measuring circuit 9. In FIG. 12, 301 is an operational amplifier 301 of very high input impedance having a non-inverting input p and an inverting input q and having an output o. 302 is a photosensitive element. Capacitors 303 and 304 have an equal capacity to each other. By these capacitors 303 and 304, the integrated value of the received light amount reflected from the object to be photographed is found. 305 is a switch circuit. When a control terminal r is high level, its terminal s-t path is rendered conducting. When the control terminal r is low level, the terminal s-t path is rendered non-conducting.

In the circuit of FIG. 12, the control terminal r is connected to the control circuit 10 so that after the judgment of the field/frame image pickup mode, when the field image pickup mode is selected, the control terminal r of the switch circuit 305 is made low level, or when the frame image pickup mode is selected, the control terminal r of the switch circuit 305 is made high level. Thus, it becomes possible to control the exposure amount of the CCD image sensor 5 so that in the frame image pickup mode, it becomes twice that of the field image pickup mode. It should be noted that though the capacity of the integration capacitor is made twice here, it is needless to say that the value of the integration result may be made ½ times as high.

Figure 13:
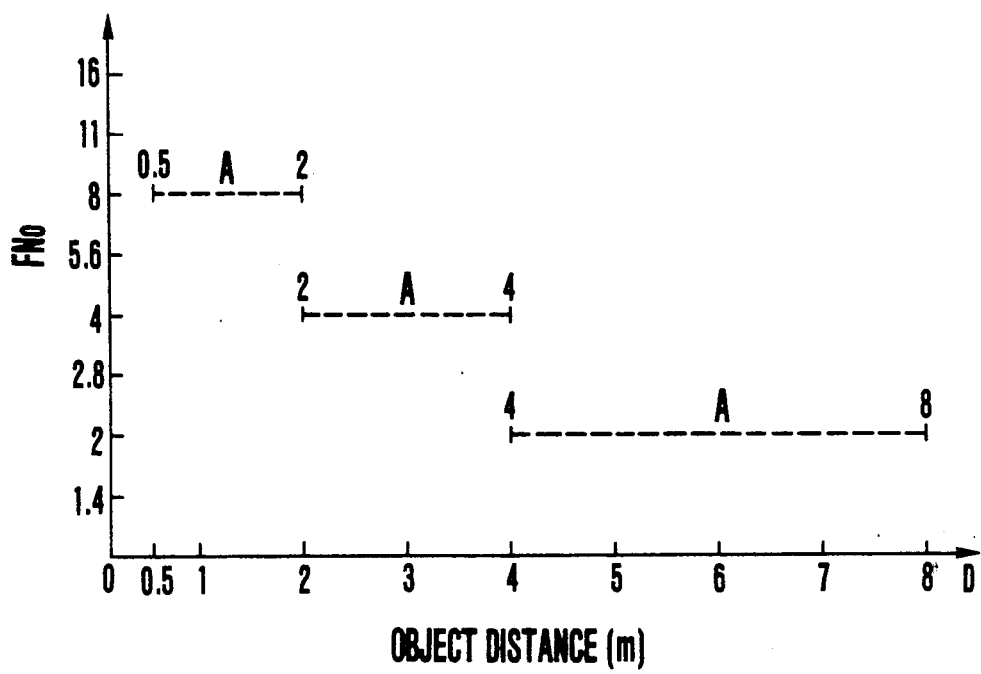
FIG. 13, FIG. 14, FIG. 15 and FIG. 16 are graphs illustrating the relationship between the distance and aperture size in each image pickup mode.
Figure 14:
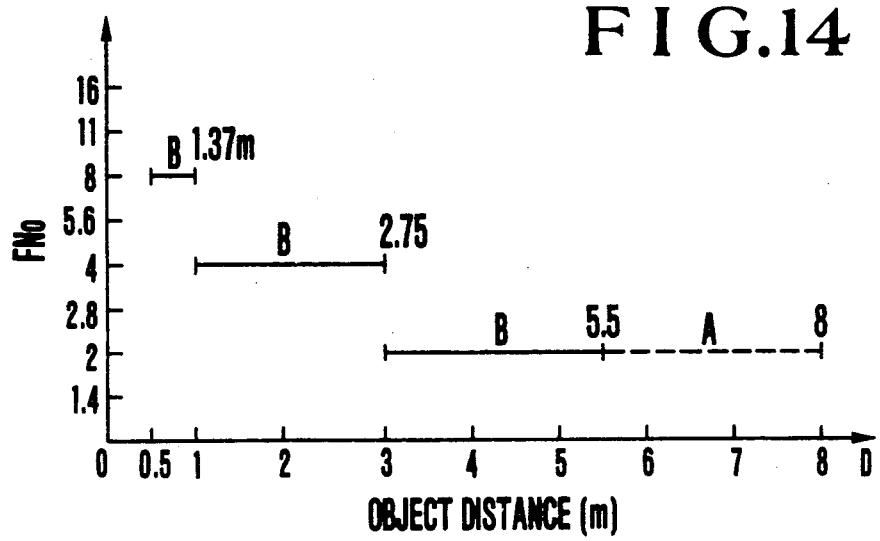

Also, though many methods can be considered on the program for aperture determination in the step S106" of FIG. 11, one example may be such that, as has been described before, in the case of the field image pickup mode, the aperture is determined according to the program of FIG. 13, while in the case of the frame image pickup mode, the aperture is determined according to the program of FIG. 14. In this case, even if the field/-frame selection operating portion 13 is set to, for example, the frame image pickup mode, it is when the distance measurement results in an object distance of more than 5.5 m that photography cannot be made in the frame image pickup mode, while in the field image pickup mode, it is possible. Therefore, photography is to be made in the field image pickup mode, and the photographer is informed of this by using the display device 11 of FIG. 6. Also, if the program line graph for the field image pickup mode is replaced by the same program as that for the frame image pickup mode of FIG. 14, ½ of the charge time for the field image pickup mode is sufficient although the amount of emitted light of the flash emitting portion 12 becomes larger. In the case of a series of continuous shots, therefore, the charge time can be shortened.

Figure 15:
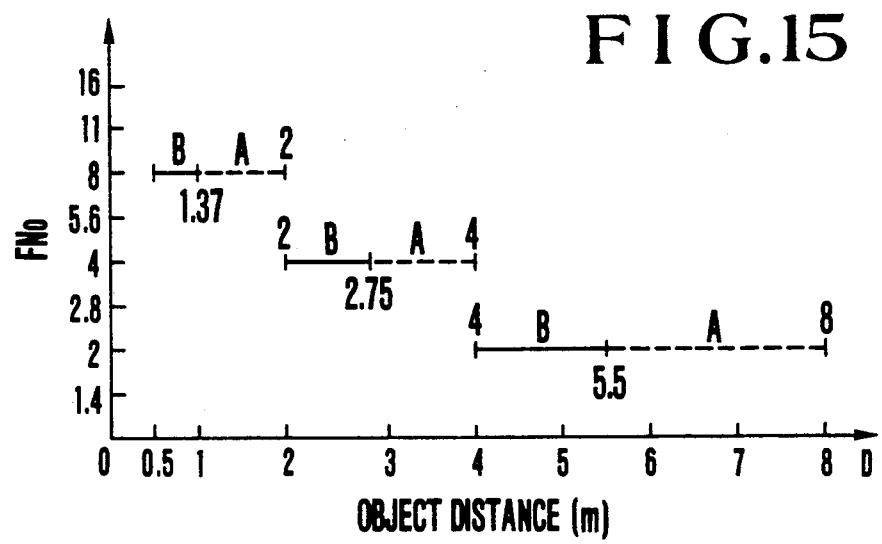

Further, it is also possible to make up such a program that as shown in FIG. 15 the frame image pickup mode (B) operates in near points in a zone of object distances, and the field image pickup mode (A) in far points.

Figure 16:
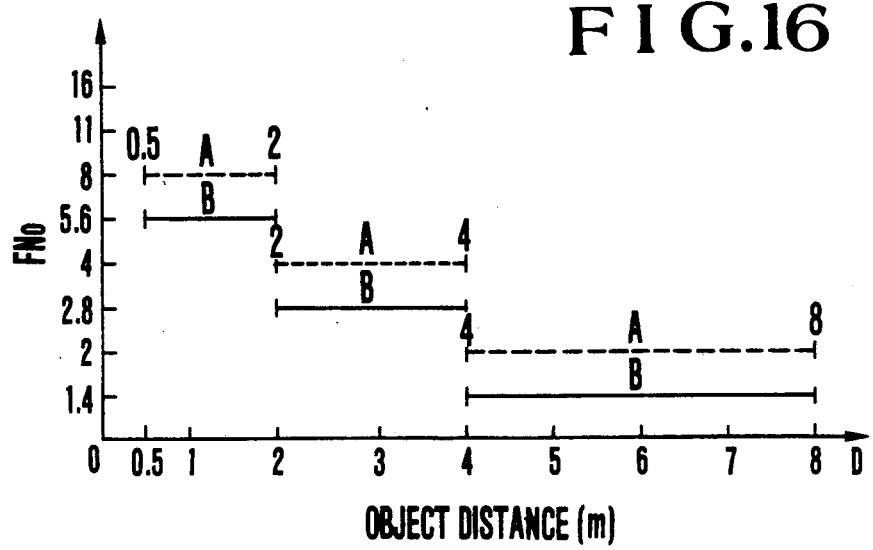

Also, despite the same zone division as shown in FIG. 16, the aperture value may be changed between the frame image pickup mode and the field image pickup mode.

In this example, if the light measuring circuit 9 in FIG. 6 is non-TTL, there is no need to switch the mode like the field/frame mode as in FIG. 12 at all. Therefore, the circuit system becomes simpler.

It should be noted that it is of course possible that the flash emitting portion 12 usable in the above-described embodiments is either built in the main body of the image pickup apparatus, or releasably attachable to the outside of the main body. Also, besides the diaphragm, the exposure amount may be controlled by the shutter.

What is claimed is:

1. An image pickup apparatus comprising:
    (a) photoelectric converting means including picture elements arranged in rows and columns;
    (b) read control means for changing over between a first mode in which a plurality of rows are combined and then read out and a second mode in which each row is read out separately;
    (c) measuring means for measuring a luminance of an object to be photographed by different light measuring characteristics corresponding to said first and said second modes of said read control means, said measuring means including a light receiving element different from said photoelectric converting means; and
    (d) exposure control means for controlling an amount of light incident on said photoelectric converting means in accordance with the measurement result of said measuring means.

2. An apparatus according to claim 1, wherein said row plurality for said read control means, in said first mode, is two rows.

3. An apparatus according to claim 2, wherein said read control means, in said first mode, changes field by field the two rows combined and read out.

4. An apparatus according to claim 1, wherein said measuring means has a measurement sensitivity being changed depending on said first and second modes.

5. An image pickup apparatus to be used with an illuminating device, comprising:
    (a) photoelectric converting means including picture elements arranged in rows and columns;
    (b) read control means for changing over between a first mode in which a plurality of rows and combined and then read out, and a second mode in which each row is read out separately; and
    (c) emitted light amount control means for changing an exposure program pattern and an amount of emitted light of said illuminating device for controlling an amount of light to be converted in image pickup means in response to changeover between said first and second modes.

6. An apparatus according to claim 5, wherein said exposure program control means changes the amount of emitted light by changing over an intensity of emitted light of said illuminating device.

7. An apparatus according to claim 5, wherein said exposure program control means changes the amount of emitted light by changing over a light emission time of said illuminating device.

8. An apparatus according to claim 5, further comprising:
    an exposure control member for changing an incident light control characteristic in response to changeover between said first and second modes.

9. An apparatus according to claim 8, wherein said exposure control member includes a diaphragm or a shutter.

10. An apparatus according to claim 5, wherein said row plurality for said read control means, in said first mode, is two rows.

11. An apparatus according to claim 10, wherein said read control means, in said first mode, changes field by field the two rows combined and read out.

12. An image pickup apparatus comprising:
    (a) photoelectric converting means including picture elements arranged in rows and columns;
    (b) exposure control means for effecting an image pickup operation by the photoelectric converting means;
    (c) judgment means for effecting judgment as to whether an exposure condition was proper or not after the image pickup operation effected by the exposure control means; and
    (d) change over means for changing over between a first mode in which a plurality of rows are combined and then read out and a second mode in which each row is read out separately, in response to a result of said judgment.

13. An apparatus according to claim 12, wherein the exposure control means includes flash light emitting means.

14. An apparatus according to claim 12, wherein the exposure control means includes a diaphragm.

15. An apparatus according to claim 12, wherein the exposure control means includes control means for controlling an image pickup period.

16. An apparatus according to claim 12, wherein the exposure control means includes a shutter.

17. An apparatus according to claim 12, wherein the judgment means is arranged to effect judgment as to whether an amount of incident light to the photoelectric converting means is proper or not.

18. An apparatus according to claim 12, wherein the changeover means is arranged to select said second mode when the exposure condition is judged to be proper by the judgment means and to select said first mode when the exposure condition is judged to be improper by the judgment means.

19. An apparatus according to claim 12, wherein a frame signal is formed by the photoelectric converting means at the time of the image pickup operation.

20. An apparatus according to claim 19, wherein the changeover means is arranged to read out said frame signal as a signal of one field in said first mode.

21. An apparatus according to claim 19, wherein the changeover means is arranged to read out said frame signal as a signal of a plurality of interlaced fields in said second mode.

22. An image pickup apparatus, comprising:
(a) image pickup means for converting an optical image into an electric signal, including picture elements arranged in rows and columns;
(b) read control means for changing over between a first mode in which a plurality of rows are combined and then read out and a second mode in which each row is read out separately; and
(c) exposure program control means for changing an exposure program pattern for controlling an amount of light converted in said image pickup means in response to changeover between said first and second modes.

23. An apparatus according to claim 22, wherein the exposure program control means is arranged to control at least a flash emitting light amount of a flash device.

24. An apparatus according to claim 22, wherein the exposure program control means is arranged to change the program pattern of a diaphragm and an object distance at the time of emitting a flash light by a flash device.

25. An apparatus according to claim 24, wherein the exposure program control means is arranged to control at least a flash emitting light amount of a flash device.

26. An image pickup apparatus, comprising:
(a) image pickup means for converting an optical image into an electric signal, including picture elements arranged in rows and columns;
(b) read control means for changing over between a first mode in which a plurality of rows are combined and then read out and a second mode in which each row is read out separately; and
(c) exposure program control means for changing an exposure program diagram for controlling an amount of light to be converted in said image pickup means in response to change over between said first and second modes.

27. An apparatus according to claim 26, wherein the exposure program control means is arranged to control at least a flash emitting light amount of a flash device.

28. An apparatus according to claim 26, wherein the exposure program control means is arranged to change the program diagram of a diaphragm and an object distance at the time of emitting a flash light by a flash device.

29. An apparatus according to claim 28, wherein the exposure program control means is arranged to control at least a flash emitting light amount of a flash device.

30. An apparatus according to claim 1, 5, 12, 22 or 26, wherein each row is read out in interlaced manner in said second mode.

31. An apparatus according to claim 12, 22 or 26, wherein said read control means, in said first mode, additively reads signals of every two rows of said photoelectric converting means.

32. An apparatus according to claim 12, 22, or 26, wherein said read control means, in said first mode, additively reads signals of every two rows of said photoelectric converting means and wherein said read control means, in said first mode, changes field by field the combination of the two rows to be added.

* * * * *

UNITED STATES PATENT AND TRADEMARK OFFICE
CERTIFICATE OF CORRECTION

PATENT NO. : 5,019,911

DATED : May 28, 1991

INVENTOR(S) : Tadashi Okino and Makoto Ise

It is certified that error appears in the above-identified patent and that said Letters Patent is hereby corrected as shown below:

On drawings sheets;

Fig. 3. Change "TO" to -- To --

Fig. 4. Change "SUFFECIENT" to -- SUFFICIENT --

Col. 2, line 24. Change "an" to -- a --

Col. 2, line 44. Change "capacity" to -- capacitor --

Col. 4, line 66. Change "$(L_1 < L_0\ 40)$" should be -- $(L_1 < L_0')$ --

Col. 7, line 31. Change "different" to -- difference --

Col. 8, line 16. Delete "assumed"

Col. 8, line 21. Change "(" to -- $\ell$ --

Col. 10, line 23. Change "and" to -- are --

Col. 10, line 64. Change "change over" too -- changeover --

Signed and Sealed this

Ninth Day of March, 1993

*Attest:*

STEPHEN G. KUNIN

*Attesting Officer*       *Acting Commissioner of Patents and Trademarks*